Nov. 3, 1964  L. APPLEMAN ETAL  3,155,814
INFRARED RADIANT HEATING OVEN
Filed July 31, 1961  4 Sheets-Sheet 1

INVENTORS
Leon Appleman
Richard H. Eck
BY
Irving Seidman
ATTORNEY

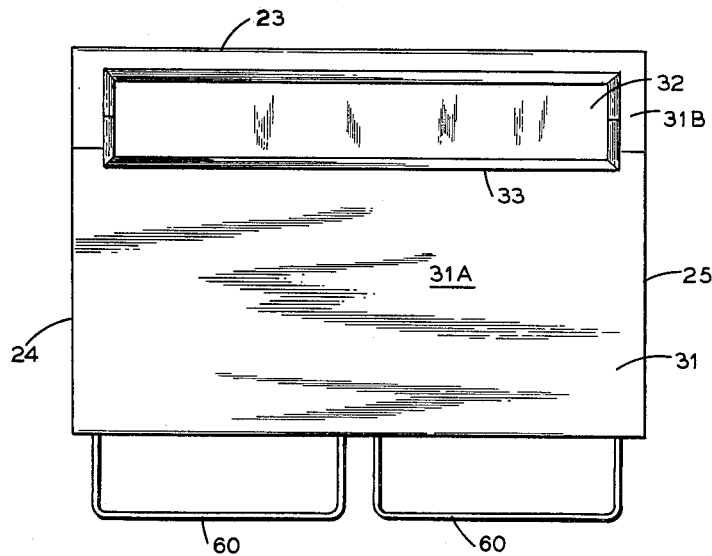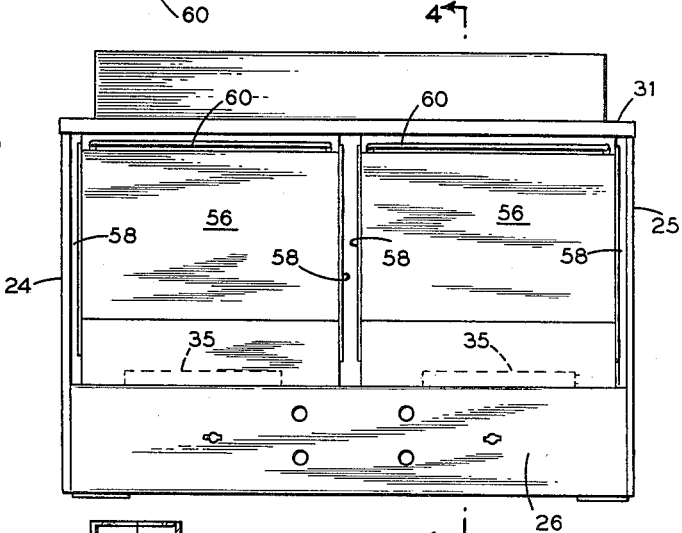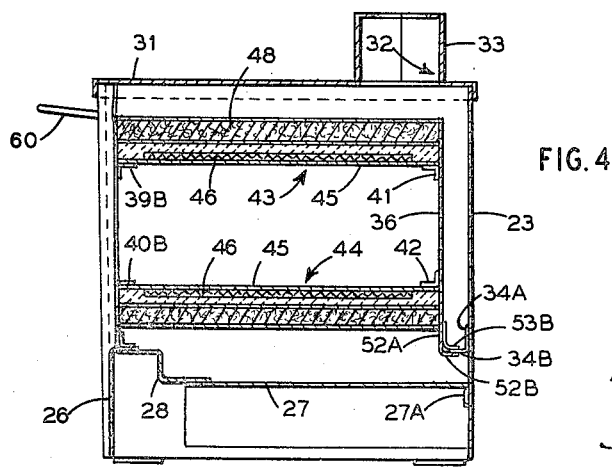

Nov. 3, 1964   L. APPLEMAN ETAL   3,155,814
INFRARED RADIANT HEATING OVEN
Filed July 31, 1961                      4 Sheets-Sheet 3

*INVENTORS*
Leon Appleman
Richard H. Eck
BY
*Irving Seidman*
ATTORNEY

Nov. 3, 1964
L. APPLEMAN ETAL
3,155,814
INFRARED RADIANT HEATING OVEN
Filed July 31, 1961
4 Sheets-Sheet 4
FIG. 8
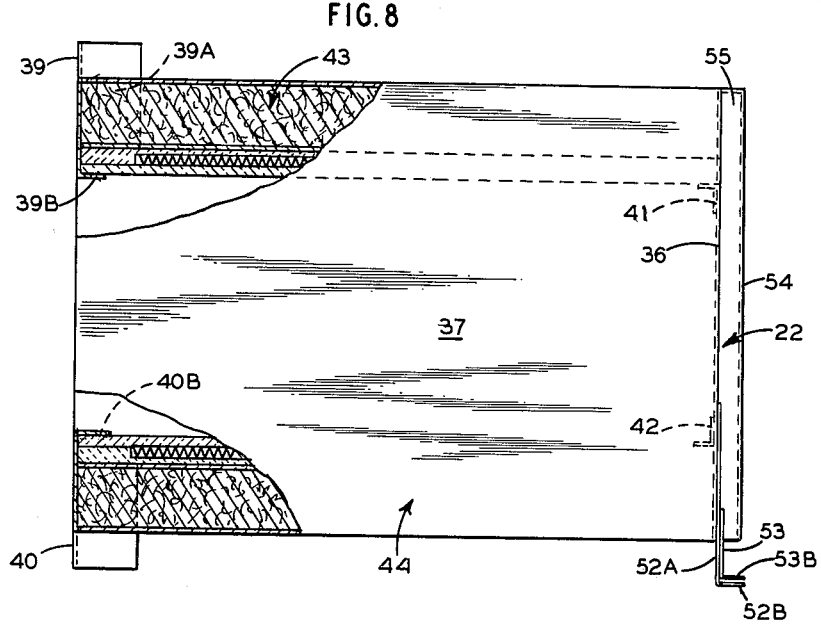
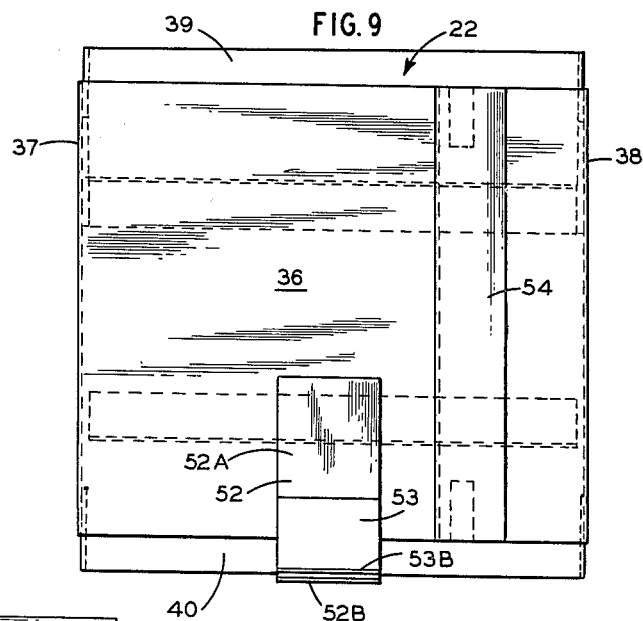
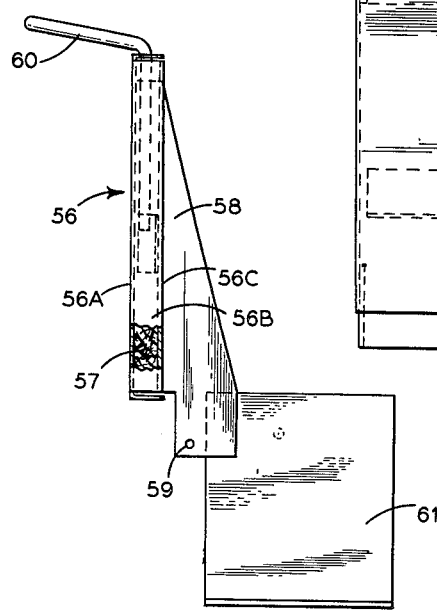
INVENTORS
Leon Appleman
Richard H. Eck
BY
Irving Seidman
ATTORNEY _United States Patent Office_

3,155,814
Patented Nov. 3, 1964

1

3,155,814
INFRARED RADIANT HEATING OVEN
Leon Appleman, Bergenfield, and Richard H. Eck, Wayne, N.J., assignors to Radiant Electronic Products Corp., New York, N.Y., a corporation of Delaware
Filed July 31, 1961, Ser. No. 128,229
8 Claims. (Cl. 219—407)

This invention relates in general to a cooking apparatus and more specifically to a cooking stove especially adapted for reconstituting frozen foods in a relatively short period of time, e.g. 2 to 7 minutes depending on the cooling characteristic of the particular food.

In the present day, prepared uncooked and pre-cooked frozen dinners, steaks, chops, fowl, vegetables, pizza, and various other frozen comestibles are gaining more and more popularity. However, the reconstituting of such frozen foods in conventional ovens have resulted in the loss of much of the food flavor, appeal and food value. In addition with conventional stove ovens it takes a considerable amount of time, e.g. 30 to 45 minutes and longer to properly cook these frozen dishes. For these reasons the serving of prepared frozen foods in commercial establishments has not been appealing and therefore was not heretofore practical. In home consumption the relatively long time it took to prepare such frozen dishes also detracted greatly from the time saving convenience purportedly afforded by the use of such foods.

Therefore an object of this invention is to provide for a new and improved means for quickly reconstituting frozen foods in a matter of minutes.

Another object of this invention is to provide for the reconstituting of frozen foods in a manner which enables the full flavor, taste and appeal of the reconstituted frozen food to be retained after cooking.

Still another object is to reconstitute pre-cooked frozen foods in a manner such that fumes, smoke and objectional odors are completely eliminated during the preparation thereof.

Still another object is to provide for the reconstituting of frozen pre-cooked foods in a manner that is relatively simple, requires no experience, and which is quick, safe, reliable and completely sanitary.

Still another object is to reconstitute frozen foods in a manner so as to impart thereto a desirable charcoal flavor without the use of charcoal.

A feature of this invention resides in the provision of an improved oven construction having a top and bottom wall formed of a fused silica plate having a high degree of purity and particularly suitable for the diffusion of high radiant heat, e.g. in the order of 800 to 1000° F., to effect reconstitution of frozen foods to the highest peak of perfection with speed and convenience.

Another feature of the invention is to provide an improved cabinet construction in which the oven is supported in spaced relationship to the outer cabinet so as to permit the circulation of ambient air therethrough and thereby air cool and insulate the outer cabinet from the hot oven.

Still another feature of the invention resides in the provision of a timer for accurately pre-setting and controlling the cooking interval for a given food or dish, and an associated warning indicator for sounding an audio signal or the like when the proper pre-set cooking time has elapsed.

Other features and advantages will become readily apparent when considered in view of the description and drawing in which:

FIG. 2 is a plan view of the apparatus of FIG. 1.

FIG. 3 is a front elevation view of the cooking apparatus with the control removed from the front panel.

FIG. 4 is a section taken along line 4—4 of FIG. 3.

FIG. 8 is a detail side view of the oven construction having parts thereof broken away and shown in sections.

FIG. 9 is a rear end view of the oven of FIG. 8.

FIG. 10 is a detail end view of the oven door.

Figure 1:
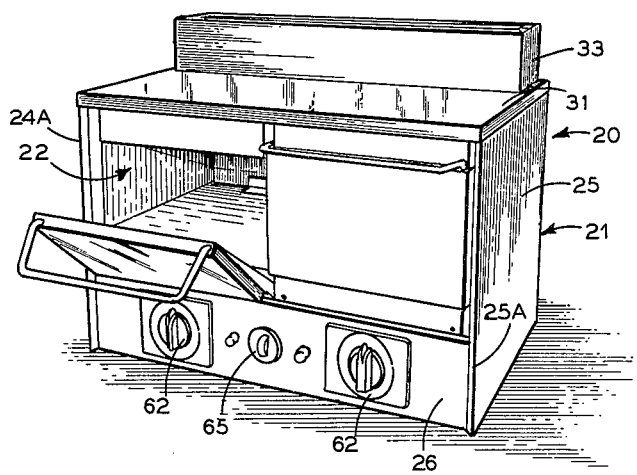
FIG. 1 is a perspective view of the improved cooking apparatus of the invention.

Referring to the drawings, the improved cooking apparatus 20 of the invention comprises an outer cabinet structure 21 and an improved oven construction 22 disposed therein so as to be supported in spaced relationship to the panels of the outer cabinet. For purposes of illustration two oven chambers or boxes 22 are illustrated in the cabinet 21, and they are disposed in spaced side by side relationship. However, it will be understood that any number of such oven chambers 22 may be housed in a given cabinet.

Figure 5:
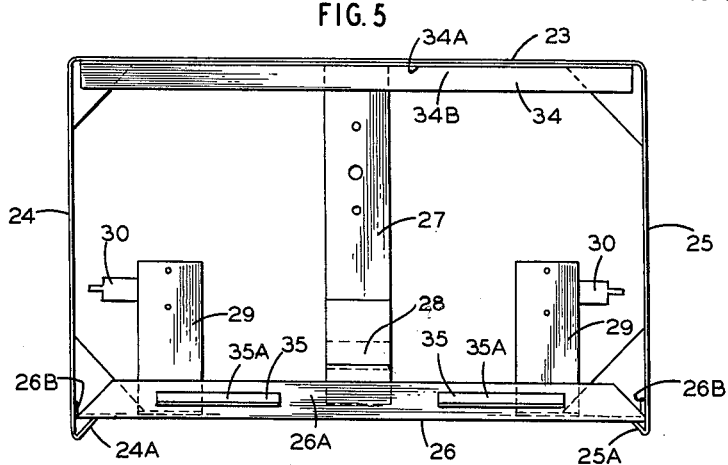
FIG. 5 is a plan view of the outer cabinet shown with the top panel and oven removed.
Figure 6:
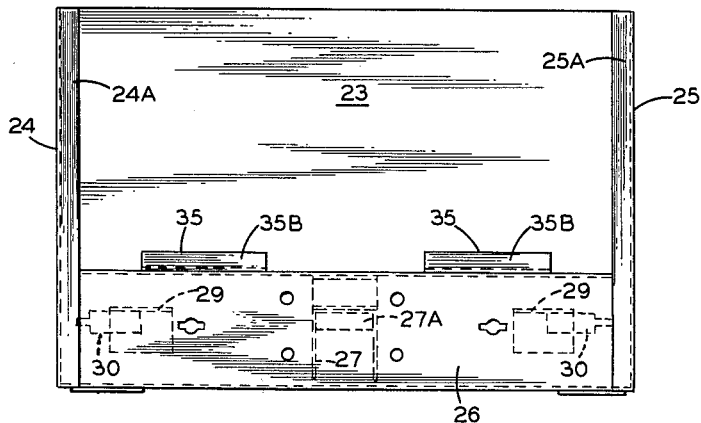
FIG. 6 is a front elevation view of the cabinet arrangement of FIG. 5.

In accordance with this invention the outer cabinet 21 comprises a main structure consisting of a rear panel 23 and integrally connected side panels 24, 25 bent at substantially right angles to the rear panel 23. As shown in FIG. 5, the front edges 24A, 25A of the side panels are reversely bent to present a smooth edge. Connected to and between the bottom front portion of the side panels 24, 25 is a front base panel 26. The base panel 26 is provided with an inturned top flange 26A and angularly bent end flanges 26B, the latter being secured to the side panels 24, 25, as by spot welding or the like.

Extending between the front base panel 26 and rear panel 23 midway between the side panels 24, 25 is a middle support 27. This middle support 27 comprises a channel shaped bent plate which is provided with a rear bent tab 27A by which it is secured to the rear panel 23. A Z-shaped plate 28 connects the front end of the middle support 27 to the flange 26A of the base plate 26. Connected to the front panel on either side of the middle support is an angle bracket 29 for supporting a door actuated switch 30, as will be hereinafter described.

A top panel 31 is supported on the rear and side panels. If desired the top may be made in two sections 31A and 31B. As shown the top sections 31A, 31B at their juncture are formed with a vent opening 32 surrounded by a wall structure to define a chimney 33. If desired the chimney may be omitted, and the top 31 provided simply with one or more vent openings.

Figure 7:
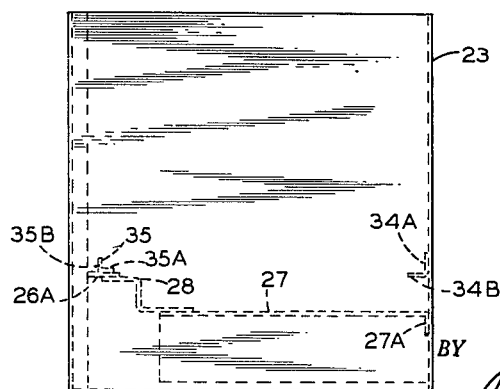
FIG. 7 is a right end view of FIG. 6.

An angle bracket 34 is connected to the inner surface of the rear panel 23. As shown in FIGS. 4, 5 and 7, bracket 34 extends transversely of the rear panel and has one leg 34A secured thereto, and has its other leg 34B disposed normal to the rear panel. Normal leg 34B of the bracket 34 is disposed in a horizontal plane substantially coincident with the flange 26A of the base panel 26. Fixed to the flange 26A of the base panel 26 is a pair of spaced oven positioning brackets 35. Each bracket 35 comprises an angle piece having a horizontal leg 35A secured to the top flange 26A, and a vertical leg 35B extending upwardly from flange 26A. The purpose of brackets 35 is to position the oven boxes 22, as will be hereinafter described.

In accordance with this invention an improved oven construction 22 is provided. In the illustrated embodiment two such oven boxes 22 are disposed within the outer cabinet in spaced side by side relationship. Each of the oven boxes 22 are similarly constructed; therefore the description of one only need be described.

As best seen in FIGS. 4, 8 and 9, the oven box 22 comprises a rear wall 36 and connected side walls 37 and 38. Extending between and connected to the side walls at the front end or open end of the oven box are upper and lower front brackets 39, 40. Each of the brackets 39, 40 are similar. Each is formed from a template having end tabs 39A, 40A, respectively, which are bent at right angles to define end flanges which are secured to the side walls of the oven. A longitudinal edge portion of the respective templates is bent to define a front flange 39B, 40B inwardly turned to form front rest for a heating element to be described. Connected to the rear wall 36 of oven 22 are horizontally spaced upper and lower angle brackets 41, 42 which form the rear support for the upper and lower heating elements 43, 44, respectively.

Accordingly the oven 22 is provided with a top and bottom heating element 43, 44. Each element 43, 44 comprises a fused silica plate 45 manufactured in accordance to my co-pending application, Serial No. 96,500, filed March 17, 1961. As shown the fused silica plate 45 forms the top and bottom walls of each oven 22. Disposed immediately adjacent the back side of the respective silica plate 45 is an asbestos backing 46 formed with continuous grooves 46A for housing therein a heating coil 47, the latter being disposed immediately adjacent the back side of the silica plate 45. Covering the back side of the asbestos backing 46 is a sheet of metal foil 48, such as aluminum. A layer of suitable insulating material 49, such as fibre glass or wool, overlies the sheet of metallic foil 48, and a stucco aluminum plate 50 covers the insulating material and form the back of the heating element. Securing the component parts of the heating element together to form a unitary structure is a rim casing 51 of sheet metal. Thus each element can then be readily fitted and supported between cooperating top and bottom front brackets 39, 40 and associated rear brackets 41, 42, respectively, of the oven structure.

Means for supporting the oven are connected to the rear wall of the oven. As best seen in FIGS. 4, 8 and 9 these means comprise a first angle bracket 52 having one leg 52A thereof secured to the rear oven wall and having its horiznotal leg 52B spaced below from and extending normal to the rear wall 36. A second angle bracket 53 is connected in overlying relationship to the first mentioned bracket 52 so that its horizontal leg 53B is spaced from the underlying horizontal leg 52A of bracket 52. Thus, with the oven box 22 separately constructed it can be positioned in its wholly assembled form within the cabinet by simply positioning the oven box 22 so that the leg 34B of bracket 34 on the rear panel 23 of the cabinet 21 is fitted between the spaced leg portions 52B and 53B of the oven rear support means. With the rear end of the oven supported, the bottom front bracket 40 of the oven is rested on the inturned flange 26A of the base plate 26 forward of the vertical leg 35B of bracket 35. This limits and defines the spacing between the cabinet 21 on the oven boxes 22.

If desired a bent plate 54 to define a vertical channel 55 for housing the electrical conduit (not shown) to the respective heater elements 43, 44 may be connected to the rear wall of the oven 22.

A door 56 is pivotally mounted to the side of the oven for swinging between open and closed positions. Each oven door 56 comprises a front panel 56A having turned peripheral flanges 56B and a back panel 56C spaced from the front panel 56A. In the space between door panels 56A, 56C there is placed a suitable insulating material 57. Connected to each side of the door and disposed normal thereto is a hinge plate 58, provided with an aperture 59 at the lower end thereof by which the door 56 is pivoted to a suitable hinge pin secured to the sides of the oven. The hinge plates 58 extending on each side of the door, it will be noted, extend throughout the height of the door so that when the door is closed the hinge plates 58 will overlie the side walls 37, 38 of its respective oven 22, and thus provide a tight oven closure when cooking. Thus a minimum of heat loss is assured when the oven is placed in operation.

A handle 60 for the door is formed of a rod suitably bent to extend outwardly of the door and having its offset end portions anchored to the back side front door panel.

Connected to the bottom of the outermost door hinge plate 58 is a cam plate 61. The arrangement of the cam plate 61 is such that it will actuate and deactuate a door micro-switch 30 supported on brackets 29 as the door is swung between open and closed position. As will be described the door switch 30 contains a pair of normally open and normally closed contacts, wired in parallel and simultaneously actuated by opening and closing the door.

In accordance with this invention, when the coils 47 are energized, the heat produced thereby is transmitted to the respective fused silica plate 45 to produce uniformly defused radiant heat which is reflected between the opposed fused plates and the wall of the oven to produce a highly concentrated heat, necessary to cook frozen food dishes in a matter of minutes. In actual tests, precooked frozen dinners, commonly referred to as a TV dinner, have been prepared in the above described stove from its frozen state to fully cooked state in 7 minutes. A raw frozen hamburger can be cooked in 3 minutes.

Because the various frozen dinners and dishes can be cooked so quickly, due to the intense radiant heat produced, it is essential that the cooking interval be accurately timed, and the operator's attention alerted thereto when the cooking interval has been completed. To accomplish this a timer 62 and an associated buzzer 63 are wired into the control circuit 64. As shown in FIG. 1, the controls, i.e. main switch 65, timer 62, and associated buzzer, are mounted on the front plate 26 of the cabinet. It will be understood that main switch 65 may be an individual toggle switch or a selector type switch.

Figure 12:
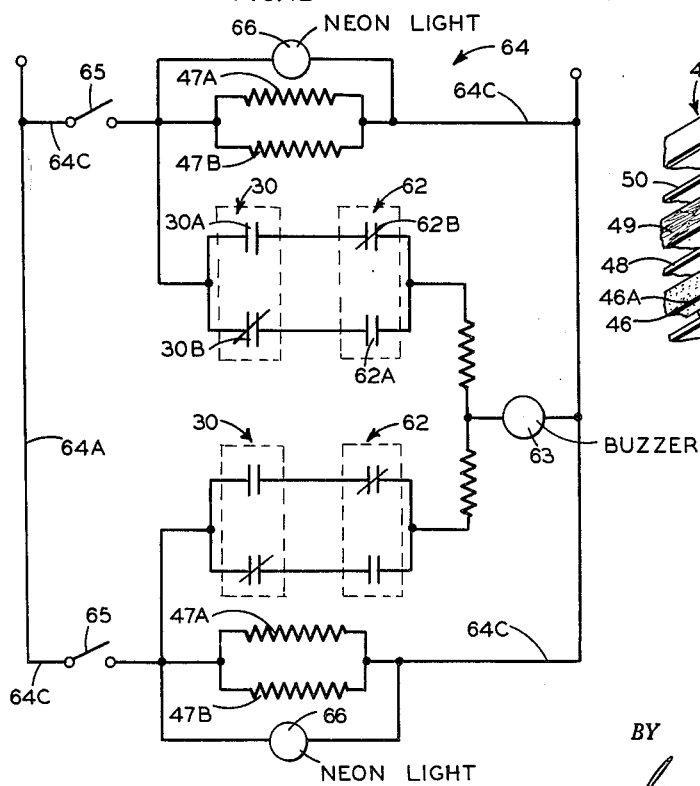
FIG. 12 is a schematic wiring diagram of the control circuit.
Figure 11:
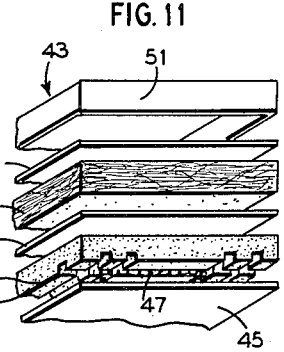
FIG. 11 is an exploded view of the heating element employed in the oven of this invention.

Referring to the diagram of FIG. 12, the control circuit 64 consists of supply conduits 64A and 64B which connect to a suitable source of electrical current. Connected across the supply conduits are the heating coils 47 of each oven. As shown the upper and lower coils 47A, 47B of each oven are connected in parallel. Across the heating coils 47A, 47B of each oven there is wired a neon light 66 for indicating when the coils of the respective ovens are energized. A switch 65 is wired in each of the lines 64C to the coils of the respective ovens so that the respective ovens may be individually energized.

Connected in series with the coils 47A, 47B of each oven is a door actuated micro-switch 30 and a timer 62. As schematically illustrated the door switch 30 is provided with normally open and normally closed contacts 30A, 30B respectively, which are simultaneously closed and opened, respectively, upon actuation of the oven door 56 between open and closed position. The timer 62 is also provided with normally open and normally closed contacts 62A and 62B connected in parallel. As shown the normal open contacts 30A of the switch 30 are disposed in series with the normally closed contacts 62B of the timer 62, and the normally closed contacts 30B of the switch 30 disposed in series with the normal open contacts 62A of the timer 62. The buzzer 63 in turn is connected in series with the timer 62 and door switch 30.

As shown in FIG. 12, the circuit is illustrated in its completely de-energized state. To operate, an oven main switch 65 is closed. This will energize the coils 47A, 47B of the oven controlled thereby only. The neon on light 66 will also light up to indicate this. With the oven door 56 open and the timer set at "0" minutes the circuit to the buzzer 63 is broken by the open contacts 30A of door switch 30 and the open contacts 62A of the timer 62. Thus the buzzer will not sound.

After the oven has been heated and a frozen dish is placed therein, the timer 62 is set to the necessary time setting, and the door 56 closed. In this position the position of the contacts 30A, 30B of the door switch and timer 62A, 62B are reversed, so that contacts 30B and 62B now break the circuit to buzzer 63, and buzzer will not sound. However, as the coking interval has been completed, the timer assumes its "0" position and thus effects the operation of its contacts 62A and 62B so that the circuit to the buzzer is completed, and it is sounded to alert the operator that the dinner is cooked precisely. Upon the sounding of the alarm, the door is opened. In doing so, the door cam 61 de-actuates the door switch 30, returning the door switch contacts 30A and 30B to their normal position, and thus breaks the circuit to the buzzer 63, thereby causing the alarm to cease. To prevent overheating of the oven 22, the door 56 is kept open in ready position to receive the next dinner.

In this manner each dinner or frozen dish is properly prepared to the precise degree of perfection. The intense oven radiant heat of 800–1000° F., seals in the natural food juices and instantly cooks the same to preserve all of the food natural flavor and appeal in a matter of minutes.

The described circuit will operate in a 120 volt A.C. system, at 15 amperes, at a rated output of 1800 watts. The overall dimensions of the stove are relatively small, thus rendering the unit readily compact and portable, or it may be easily supported on a counter top. While the particular dimensions may vary, the total volume of an oven box is under one cubic foot, as the approximate inside dimension of the oven is 4 x 8 x 10 inches.

While the instant invention has been disclosed with reference to a particular method and a particular embodiment for practicing the same, it is to be appreciated that the invention is not to be taken as limited to all of the details thereof as modifications and variations thereof may be made without departing from the spirit or scope of the invention.

What is claimed is:

1. A cooking apparatus adapted for reconstituting frozen foods in substantially two to seven minutes comprising a cabinet having rear and connected side panels, a front panel connected to and extending between the bottom front edge portion of said side panels, a top panel having a vent opening supported by said rear and connected side panels, an oven, means supporting said oven in spaced relationship with respect to said cabinet top, rear and side panels to define therebetween an air space, a fused silica plate forming the top walls of said oven and a second fuse silica plate forming the bottom wall of said oven, said silica plates defining respectively the entire extent of the top and bottom walls of said oven, an electric heating coil disposed adjacent each of said plates for imparting heat thereto, and an oven door for opening and closing the front end of said oven.

2. A cooking apparatus comprising a cabinet having a rear and connected side panels, a front base panel connected to and extending between the bottom front edge portion of said side panels, said base panel having an upper inwardly turned flange, a top panel supported in said rear and connected side panels, said top panel having a flue opening therein, a rear angle bracket extending transversely of said rear panel, said bracket having a leg portion thereof connected to the inner surface of said rear panel and the other leg portion disposed normal to said rear panel, an oven having rear and connected side walls supported in said cabinet by said rear bracket and inturned flange of said front panel so that the walls of said oven are spaced from the panels of said cabinet, said oven having a top heating means and a second bottom heating means disposed between said oven walls, each of said heating means including a fuse silica plate defining respectively the entire top wall and bottom walls of said oven, said plate defining the top wall of the oven being spaced from the top panel of said cabinet, and an oven door for opening and closing the front end of said oven.

3. The invention as defined in claim 2 wherein each of said top heating means and bottom heating means each includes a heating coil disposed adjacent said plate, and a layer of insulating material backing said heating coil.

4. A cooking apparatus comprising a cabinet having an integrally formed rear and connected side panel, a front base panel connected to and extending between the bottom front edge portion of said side panels, said base panel having an upper inwardly turned flange, a top panel supported in said rear and connected side panels, flue means connected to said top panel, a rear angle bracket extending transversely of said rear panel, said bracket having a vertical leg portion thereof connected to the inner surface of said rear panel and the horizontal leg portion disposed normal to said rear panel, a front angle bracket disposed opposite said rear bracket and connected to the flange of said front panel, an oven having rear and connected side walls, a pair of cooperating superposed angles connected intermediate the rear wall of said oven, said cooperating angles having spaced horizontal leg portions, said oven being supported in said cabinet by disposing the normal leg of said rear bracket between the spaced leg portions of the cooperating angles and supporting the front of the oven on the inturned flange of said front base panel so that the walls of said oven are spaced from the panels of said cabinet, said front bracket positioning the front of said oven on said base panel, said oven having a top heating element and a second bottom heating element disposed between said oven walls, said top element being spaced from the top of said oven, and an oven door pivoted to the sides of the oven for opening and closing the front end of said oven, each of said heating elements respectively including a fused silica plate extending substantially the entire extent of the top and bottom walls of the oven.

5. A cooking apparatus for quickly reconstituting frozen foods in approximately two to seven minutes comprising a cabinet defined by a rear panel and integrally connected side panels, a front base panel connected to and between said side panels, a top panel having a flue opening therein supported on said rear and side panels, an oven supported between the panels of said cabinet in spaced relationship therewith to define an air space about said oven for the circulation of ambient air therearound to insulate said cabinet from said oven, said flue opening being in communication with said air space for venting the air circulation through said air space, a fused silica plate forming the top wall of said oven and a second fused silica plate forming the bottom wall of said oven, a heating coil positioned on the back side of said plates for imparting heat thereto, said plates defining respectively substantially the entire extent of the top and bottom walls of said oven, each of said plates being capable of diffusing the radiant heat imparted thereto by its respective coil, and an oven door pivotally connected to the side wall of said oven for movement between open and closed position, an electric circuit for energizing said coils, said circuit including a timer to indicate a predetermined cooking interval, a signal indicator associated with said timer for indicating the lapse of said interval, switch means for rendering said signal operative and inoperative, and said door having means for activating said switch when closed to energize said signal indicator upon the lapse of said predetermined cooking interval and said door deactivating said switch means for de-energizing said indicator when the door is opened.

6. A cooking apparatus for quickly reconstituting frozen foods in approximately two to seven minutes comprising a cabinet defined by a rear panel and connected side panels, a front base panel having an inwardly turned upper flange, said base panel connected to and between said side panels, a top panel having a flue opening supported on said rear and side panels, a chimney circumscribing said opening, a middle support connected to and between said base panel and rear panel midway between said side panels, a rear angle bracket connected to the inner surface of said rear panel, a front angle bracket disposed opposite said rear bracket and connected to the flange of said base panel, a pair of ovens disposed in side by side relationship within said cabinet, each of said ovens comprising a rear wall and connected side walls, a fused silica plate defining the top wall of each oven and a second fused silica plate defining the bottom wall of each oven, each of said plates respectively extending substantially the entire extent of the top and bottom walls of each oven, a heating coil disposed adjacent each of said plates on the back side of the respective plates, a layer of insulation forming a backing for each coil, each of said ovens having support means for cooperating with said brackets for spacing each of said ovens in spaced relationship to panels of said cabinet and from each other, and an electric circuit for energizing said coils, said circuit including a timer for presetting the cooking interval, a buzzer associated with said timer for giving an audio signal when said cooking interval has lapsed, a switch means connected in series with said buzzer for opening and closing the circuit thereto, and a door pivoted to said oven and having means connected thereto for actuating said switch so that said switch is closed to energize said buzzer upon the lapse of said cooking interval when the door is closed and open to de-energize the buzzer when the door is opened.

7. A cooking apparatus adapted for reconstituting frozen foods in a matter of minute comprising,
(a) a cabinet having rear and connected side panels,
(b) a front panel connected to and extending between the bottom front edge portion of said side panels,
(c) a top panel supported on said rear and side panels,
(d) an oven,
(e) means supporting said oven within cabinet in spaced relationship to the respective panels thereof to define an ambient air circulating space therebetween,
(f) means defining a vent for said oven and said ambient air space,
(g) a fused silica plate forming the top wall of said oven and,
(h) second fused silica plate defining the bottom wall of said oven,
(i) each of said silica plates defining respectively the entire extent of the top and bottom wall respectively of said oven,
(j) an electric heating coil disposed adjacent to each of said plates to impart heat thereto,
(k) and an oven door for opening and closing the front of said opening.

8. The invention as defined in claim 7 and including,
(a) an asbestos backing for each of the respective coils,
(b) a layer of foil extended over the asbestos backing, and
(c) a layer of insulating material extended over said foil.

References Cited in the file of this patent
UNITED STATES PATENTS

| | | |
|---|---|---|
| 1,815,312 | Heise | July 20, 1931 |
| 2,486,701 | Berg | Nov. 1, 1949 |
| 2,545,805 | Callender | Mar. 20, 1951 |
| 2,705,947 | Pearce | Apr. 12, 1955 |
| 2,767,297 | Benson | Oct. 16, 1956 |
| 2,833,908 | Scofield | May 6, 1958 |
| 2,850,612 | Quirk | Sept. 2, 1958 |
| 2,864,932 | Forrer | Dec. 16, 1958 |
| 2,922,866 | Hicks | Jan. 26, 1961 |
| 3,059,087 | Perlman | Oct. 16, 1962 |
| 3,085,143 | Antoncich | Apr. 9, 1963 |

FOREIGN PATENTS

| | | |
|---|---|---|
| 453,861 | France | Apr. 15, 1913 |
| 564,853 | France | Oct. 30, 1923 |
| 649,088 | France | Aug. 21, 1928 |